UNITED STATES PATENT OFFICE 2,232,350

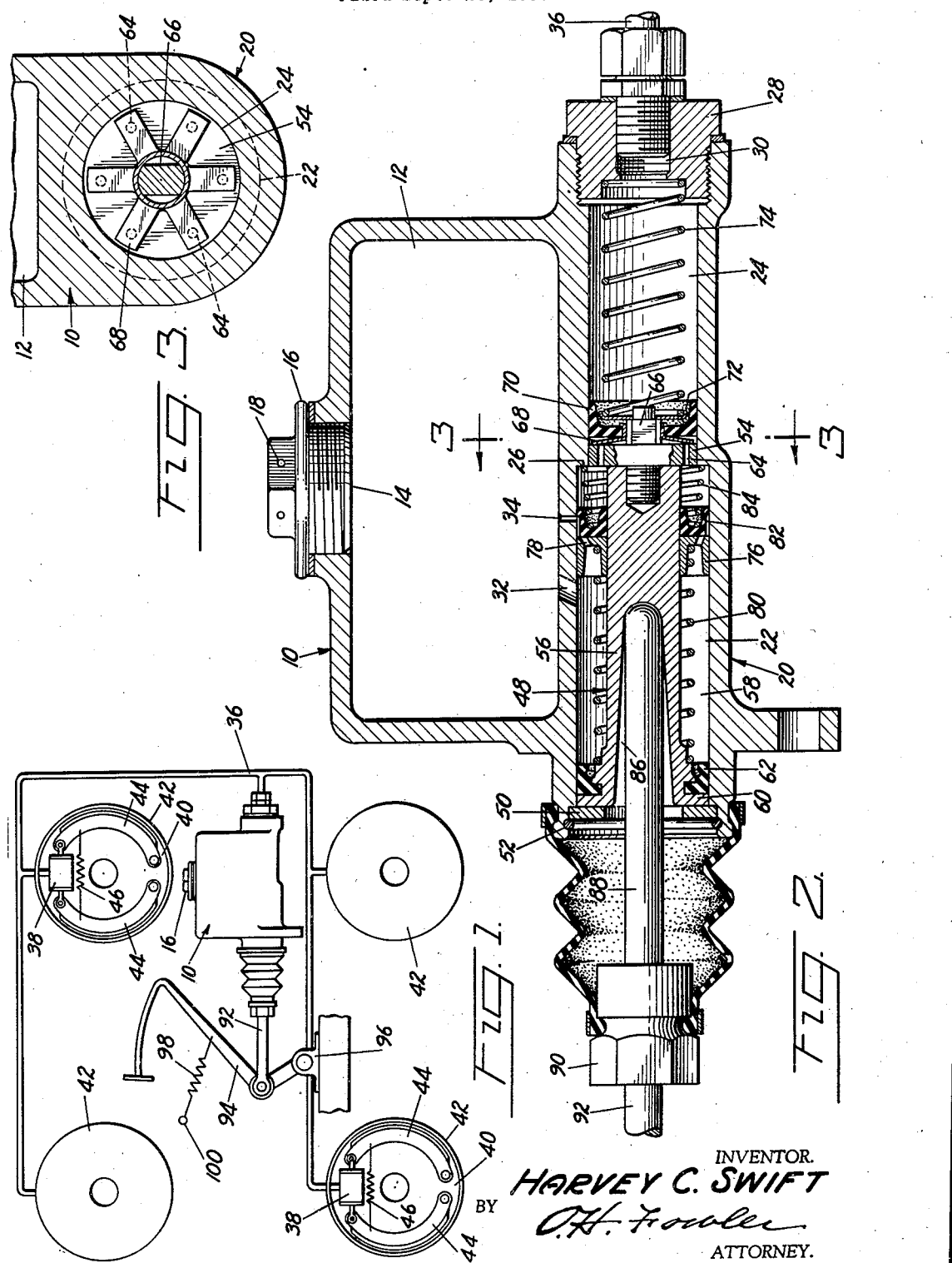

FLUID PRESSURE BRAKING SYSTEM

Harvey C. Swift, Detroit, Mich., assignor to Hydraulic Brake Company, Detroit, Mich., a corporation of California Application September 26, 1938, Serial No. 231,831

6 Claims. (Cl. 60—54.6)

This invention relates to fluid pressure braking systems.

An object of the invention is to provide a fluid pressure braking system including a fluid pressure producing device operative to maintain a positive pressure on the fluid in the system.

Another object of the invention is to provide a fluid pressure system including a fluid pressure producing device operative to maintain a positive pressure on the fluid in the system and to compensate for expansion and contraction of the fluid incident to changes in temperature.

A feature of the invention is a cylinder, and a piston movable in the cylinder for creating pressure having mounted thereon back of its head a loaded annular piston effective for maintaining a positive pressure.

Other objects and features of the invention will appear from the following description taken in connection with the drawing forming a part of this specification, and in which—

Fig. 1 is a schematic view of a fluid pressure braking system embodying the invention;

Fig. 2 is a vertical sectional view of the fluid pressure producing device; and

Fig. 3 is a sectional view substantially on line 3—3, Fig. 1.

Referring to the drawing for more specific details of the invention, 10 represents generally a fluid pressure producing device including a reservoir 12 having a filling opening 14 normally closed as by a plug 16 provided with openings 18 for venting the reservoir to the atmosphere.

A cylinder 20 at the base of the reservoir has a large chamber 22 and a relatively small chamber 24 arranged forward of the large chamber concentrically thereto and in direct communication therewith and providing at its junction with the large chamber an annular shoulder 26. The outer end of the small chamber 24 is closed as by a head 28 provided with a discharge port 30, and arranged in the wall of the large chamber 22 are ports 32 and 34 providing communications between the large chamber and the reservoir 10.

A fluid pressure delivery pipe or conduit 36 suitably connected to the discharge port has branches connected respectively to fluid pressure actuated motors 38 preferably arranged in pairs, one pair for actuating brakes associated with the front wheels of a vehicle and another pair for actuating brakes associated with the rear wheels of the vehicle.

The brakes may be of any conventional type. Preferably each of the brakes includes a fixed support or backing plate 40 adapted to be secured to an axle or to an axle housing, a rotatable drum 42 associated with the backing plate adapted to be secured to a wheel, a pair of corresponding interchangeable friction elements or shoes 44 mounted on the backing plate for co-operation with the drum, a retractile spring 46 connecting the shoes, and a motor corresponding to the motors 38 mounted on the backing plate and connected to the shoes and operative to actuate the shoes into engagement with the drum against the resistance of the retractile springs.

A piston 48 reciprocable in the cylinder 20 is held against displacement by a washer 50 seated on an annular shoulder in the open end of the large chamber and secured in place by a retaining ring 52 fitted in a groove in the wall of the cylinder. The piston 48 includes a detachable head 54 movable in the small chamber 24, a reduced body portion 56 providing in conjunction with the inner wall of the cylinder an annular chamber 58 communicating with the reservoir as by way of the port 32, and a skirt 60 slidably engaging the inner wall of the large chamber 22 and supporting a sealing cup 62 for inhibiting seepage of fluid from the cylinder.

The head 54 has spaced passages 64 therethrough providing communications between the annular chamber 58 and that portion of the small chamber 24 forward of the piston. The head 54 also has an extension 66, and sleeved on the extension is a flexible spider 68 yieldingly supporting a sealing cup 70 for control of the passages 64. The extension 66 also has fitted thereon a spring rest 72, and interposed between this rest and the head 28 of the cylinder is a spring 74 for returning the piston to its retracted position.

An annular piston 76 slidable on the reduced body portion 56 of the piston 48 between the head 54 and the skirt 60 of the piston 48 divides the annular chamber 58 into two sections communicating with one another by way of passages 78 through the head of the annular piston. A spring 80 interposed between the skirt 60 and the back of the head of the annular piston serves to yieldingly support the annular piston, and a sealing cup 82 seated on the head and held against displacement by a spring 84 interposed between the cup and the annular shoulder 26 effectively controls the passages 78.

A recess 86 in the back of the piston 48 receives one end of a thrust pin 88 having on its other end a coupling 90 connected to the open end of the chamber 22 of the cylinder as by a flexible boot for the exclusion of dust and other foreign substances from the cylinder, and a rod 92 connects the coupling 90 to a foot pedal lever 94 pivoted on a bracket 96 and connected by a retractile spring 98 to a fixed support 100.

In a normal operation, upon depressing the foot pedal lever 94, force is transmitted therefrom through the rod 92 and thrust pin 88 to the piston 48, resulting in moving the piston on its compression stroke. During the initial movement of the piston on its compression stroke, pressure created in the chamber 24 seats the sealing cup 70 on the head 54 of the piston against the resistance of the flexible spider 68, and, thereafter, as the piston 48 proceeds on its compression stroke, the fluid in the chamber 24 forward of the piston is displaced therefrom through the discharge port 30 and fluid pressure delivery pipe or conduit and its respective branches into the fluid pressure actuated motors 38, causing energization of the motors, and this energization of the motors results in actuation of the shoes 44 of the respective brakes into engagement with the drums 42.

At the conclusion of a braking operation, the foot pedal lever 94 is released, whereupon the lever returns to its retracted position under the influence of the retractile spring 98. This movement of the foot pedal retracts the rod 92 and the thrust pin 88, resulting in releasing the piston 48 and return of the piston to its retracted position under the influence of the spring 74.

As the piston 48 returns to its retracted position, a partial vacuum is created in the chamber 24, resulting in drawing fluid from the reservoir, through the port 32, into the annular chamber 58, thence through the passages 78 in the head of the annular piston 76, past the cup 82 on the head of the annular piston, into that portion of the cylinder between the annular piston and the back of the head 54 of the piston 48, thence through the passages 64 in the head of the piston 48, through the spider 68 and cup 70 into that portion of the chamber 24 forward of the piston 48, completely filling the chamber 24. During this cycle of the operation, fluid is returning to the cylinder or the chamber 24 from the fluid pressure actuated motors 38 and fluid pressure delivery pipes connecting the motors to the chamber 24.

Under this condition, the chamber 24 receives a quantity of fluid in excess of its capacity, and this excess fluid is displaced from the chamber 24 through the sealing cup 70, the spider 68 and the passages 64 in the head of the piston 48 into the annular chamber 58, and thence through the port 34 into the reservoir.

Upon completion of the foregoing cycle, the spring 80 urges the annular piston 76 forward so that the sealing cup 82 on the head of the annular piston may close the port 34, and that pressure may be imposed on the fluid in the system. The pressure imposed on the fluid is complementary to the load on the spring 80. Due to expansion and contraction of the fluid, incident to temperature changes, the pressure maintained on the fluid is variable. However, the load on the spring 80 is sufficient to maintain a positive pressure on the fluid in the system at all times.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising a cylinder, a piston movable therein for producing pressure, an auxiliary piston reciprocable on the piston, and means imposing a load on the auxiliary piston to maintain a positive pressure on the fluid forward of the auxiliary piston when both pistons are at rest.

2. A fluid pressure producing device comprising a cylinder, a piston movable therein for producing pressure, means for by-passing fluid past the piston when at rest and during its retraction, an auxiliary piston reciprocable on the piston, and means imposing a load on the auxiliary piston to maintain a positive pressure on the fluid forward of the auxiliary piston.

3. A fluid pressure producing device comprising a cylinder, a piston movable therein for producing pressure, means for by-passing fluid through the head of the piston when at rest and on its retraction stroke, an annular piston slidably mounted on the body of the piston, and means imposing a load on the annular piston for maintaining a positive pressure on the fluid forward of the auxiliary piston.

4. A fluid pressure producing device comprising a reservoir, a cylinder supplied therefrom, a piston movable in the cylinder for producing pressure having a head and skirt and a reduced body portion between its head and skirt, means for by-passing fluid through the head when the piston is at rest and on its retraction stroke, an annular piston slidable on the reduced body portion of the piston, and means imposing a load on the auxiliary piston to maintain a positive pressure on the fluid in the cylinder.

5. A fluid pressure producing device comprising a reservoir, a cylinder at the base thereof having a large chamber and a relatively small chamber, a piston movable in the cylinder for producing pressure having a head fitted in the small chamber, a skirt fitted in the large chamber and a reduced body portion between the head and the skirt, means for by-passing fluid through the head of the piston when the piston is at rest and on its retraction stroke, an annular piston slidable on the reduced body portion of the piston, means imposing a load on the annular piston to maintain a positive pressure on the fluid in the cylinder, and means for actuating the piston.

6. A fluid pressure producing device comprising a reservoir, a cylinder at the base thereof including a large chamber having spaced ports communicating with the reservoir and a relatively small chamber, a piston movable in the cylinder for producing pressure including a head fitted in the small chamber, a skirt fitted in the large chamber and a reduced body portion between the head and skirt, means for by-passing fluid through the head of the piston when the piston is at rest and on its retraction stroke, an annular piston slidably mounted on the reduced body portion having passages therethrough, means carried by the annular piston for control of the passages and of at least one of the ports providing a communication between the large chamber and the reservoir, means imposing a load on the annular piston, and means for actuating the piston.

HARVEY C. SWIFT.